(12) United States Patent
Appelman (10) Patent No.: US 6,385,656 B1
(45) Date of Patent: *May 7, 2002

(54) SELECTIVE RECOMPRESSION OF FILES IN A NETWORK SYSTEM

(75) Inventor: Barry Appelman, Great Falls, VA (US)

(73) Assignee: America Online, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/371,208

(22) Filed: Aug. 10, 1999

Related U.S. Application Data (63) Continuation of application No. 08/630,846, filed on Apr. 11, 1996, now Pat. No. 6,112,250.

(51) Int. Cl.[7] .............................................. G06F 15/16
(52) U.S. Cl. ..................... 709/247; 709/203; 709/246; 370/202; 348/441
(58) Field of Search ................................ 709/203, 246, 709/247; 370/202; 348/441

(56) References Cited

U.S. PATENT DOCUMENTS

| | | | | |
|---|---|---|---|---|
| 4,125,873 A | * | 11/1978 | Chesarek | 345/202 |
| 4,271,476 A | * | 6/1981 | Lotspiech | 382/235 |
| 5,087,913 A | * | 2/1992 | Eastman | 341/95 |
| 5,131,016 A | * | 7/1992 | Broughton et al. | 375/122 |
| 5,182,762 A | * | 1/1993 | Shirai et al. | 375/222 |
| 5,276,898 A | * | 1/1994 | Kiel et al. | 395/800 |
| 5,287,420 A | * | 2/1994 | Barrett | 382/233 |
| 5,392,036 A | * | 2/1995 | Klein | 341/51 |
| 5,410,671 A | * | 4/1995 | Elgamal et al. | 395/425 |
| 5,500,928 A | * | 3/1996 | Cook et al. | 395/133 |
| 5,506,580 A | * | 4/1996 | Whiting et al. | 341/51 |
| 5,539,908 A | * | 7/1996 | Chen et al. | 709/305 |
| 5,557,749 A | * | 9/1996 | Norris | 395/200.18 |
| 5,563,649 A | * | 10/1996 | Gould et al. | 348/17 |
| 5,574,906 A | * | 11/1996 | Morris | 395/601 |
| 5,581,366 A | * | 12/1996 | Merchant et al. | 358/400 |
| 5,590,317 A | * | 12/1996 | Iguchi et al. | 707/2 |
| 5,649,151 A | * | 7/1997 | Chu et al. | 711/111 |
| 5,757,965 A | * | 5/1998 | Ohki | 382/232 |
| 5,805,735 A | * | 9/1998 | Chen et al. | 382/239 |
| 5,805,827 A | * | 9/1998 | Chau et al. | 709/247 |
| 5,838,967 A | * | 11/1998 | Okayama et al. | 707/200 |
| 5,862,347 A | * | 1/1999 | Suzuki et al. | 709/247 |
| 6,223,211 B1 | * | 4/2001 | Hamilton et al. | 709/203 |

FOREIGN PATENT DOCUMENTS

EP    0 616 455 A2    9/1994    ........... H04L/29/06

* cited by examiner

Primary Examiner—Saleh Najjar
(74) Attorney, Agent, or Firm—Fish & Richardson P.C.

(57) ABSTRACT

A recompression server that automatically decompresses selected pre-compressed data streams and recompresses the decompressed data to a greater degree than the original pre-compressed data. In one embodiment, the recompression server determines from a request whether a requested file is pre-compressed. In another embodiment, the recompression server determines from a retrieved requested file's name or attributes whether the file is pre-compressed. Optionally, the recompression server may compress requested but previously uncompressed files. As another option, the recompression server may cache frequently requested files in re-compressed form to further optimize the bandwidth of a wide area network. Such caching can be done on-line or off-line.

75 Claims, 5 Drawing Sheets

SELECTIVE RECOMPRESSION OF FILES IN A NETWORK SYSTEM

This application is a continuation of Ser. No. 08/630,846 Apr. 4, 1996 U.S. Pat. No. 6,112,250.

BACKGROUND OF THE INVENTION

1. Field of the Invention

This invention relates to electronic computers and network systems, and more particularly to a network server for automatically decompressing selected pre-compressed data streams and recompressing the decompressed data to a greater degree than the original pre-compressed data.

2. Description of Related Art

Figure 1:
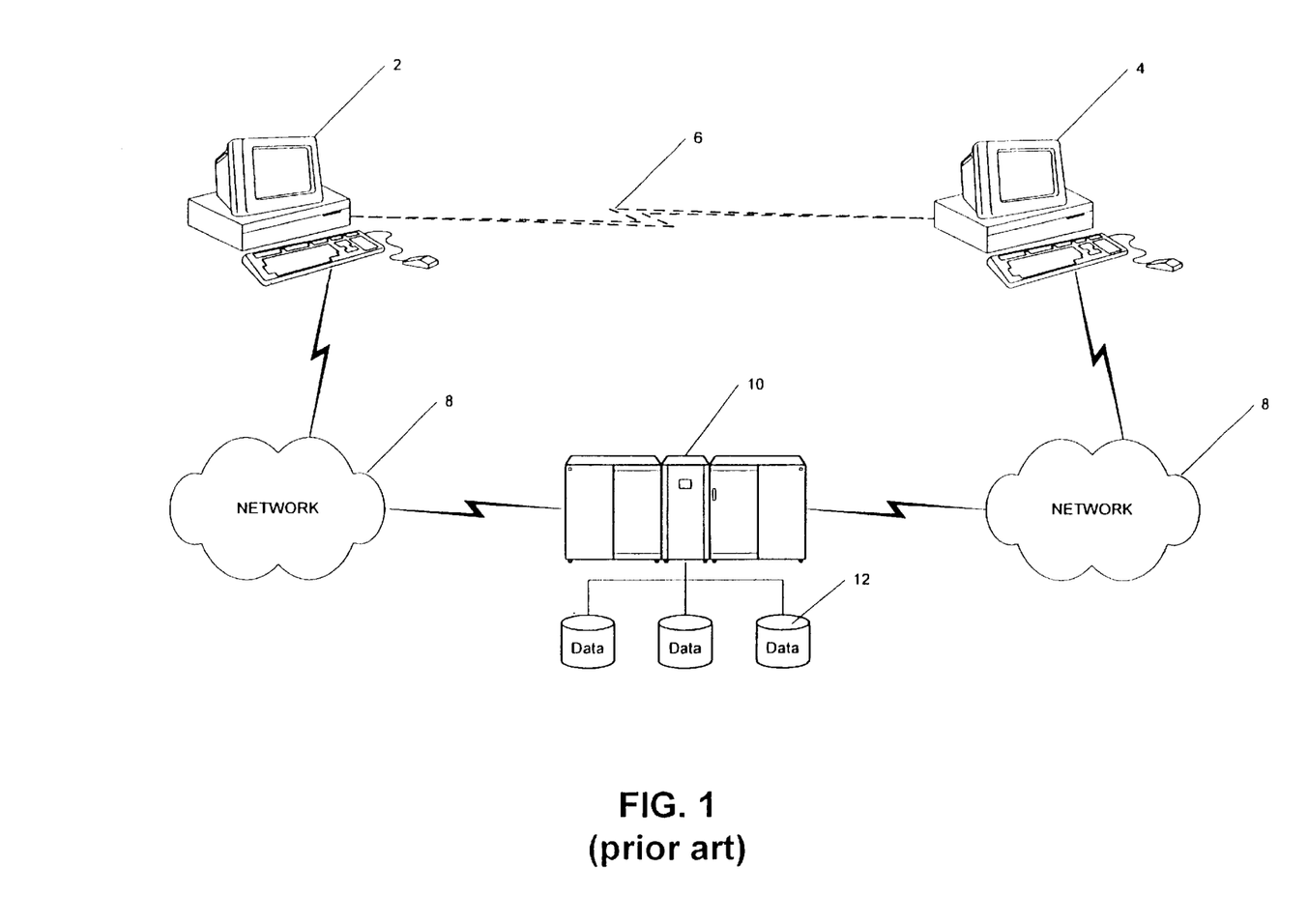
FIG. 1 is a diagram of a prior art wide area network system, such as the Internet.

FIG. 1 is a diagram of a prior art wide area public network system, such as the Internet. A first node 2 (which may be a workstation, a terminal, a personal computer, or the like), can communicate with a second node 4 (which may be a network server, a minicomputer or mainframe computer, a personal computer, or the like) by an apparently direct connection 6. In reality, the connection between node 2 and node 4 is made through a network "cloud" of connections 8, generally through one or more "proxy" server computers 10 that help route requests through the network 8. Such proxy server computers 10 generally include storage devices 12 for storing various sorts of data.

Each connection between a pair of nodes 2, 4 consumes some amount of communication bandwidth. In order to conserve bandwidth, it is common to pre-compress files to be transmitted from one node 2 to another 4. For example, graphics images may be pre-compressed using commonly available file formats, such as the Graphics Interchange Format (GIF), Tagged Interchange File Format (TIFF), and JPEG. (It should be understood that the term "files" as used herein includes live data streams, collections or archives of files, portions of files, data blocks, etc.)

One drawback of the present system is that such pre-compressed files may not be optimally compressed, thus wasting bandwidth. However, a requestor node 2 generally has no ability to cause a provider node 4 to optimize compression of requested files.

Another existing problem is that many files on provider nodes 4 are not pre-compressed at all. While some compression may be achieved automatically by use of transport protocols or modems that include a compression function, there is no general solution to this problem.

The present invention is based on the inventor's recognition of a need for optimizing bandwidth usage in a network system for pre-compressed data files, and a need for general method of compressing files that are not pre-compressed.

The present invention provides a solution to these problems.

SUMMARY OF THE INVENTION

The present invention is a recompression server that automatically decompresses selected pre-compressed data streams and recompresses the decompressed data to a greater degree than the original pre-compressed data. In one embodiment, the recompression server determines from a request whether a requested file is pre-compressed. In another embodiment, the recompression server determines from a retrieved requested file's name or attributes whether the file is pre-compressed.

Optionally, the recompression server may compress requested but previously uncompressed files. As another option, the recompression server may cache frequently requested files in re-compressed form to further optimize the bandwidth of a wide area network. Such caching can be done on-line or off-line.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 2:
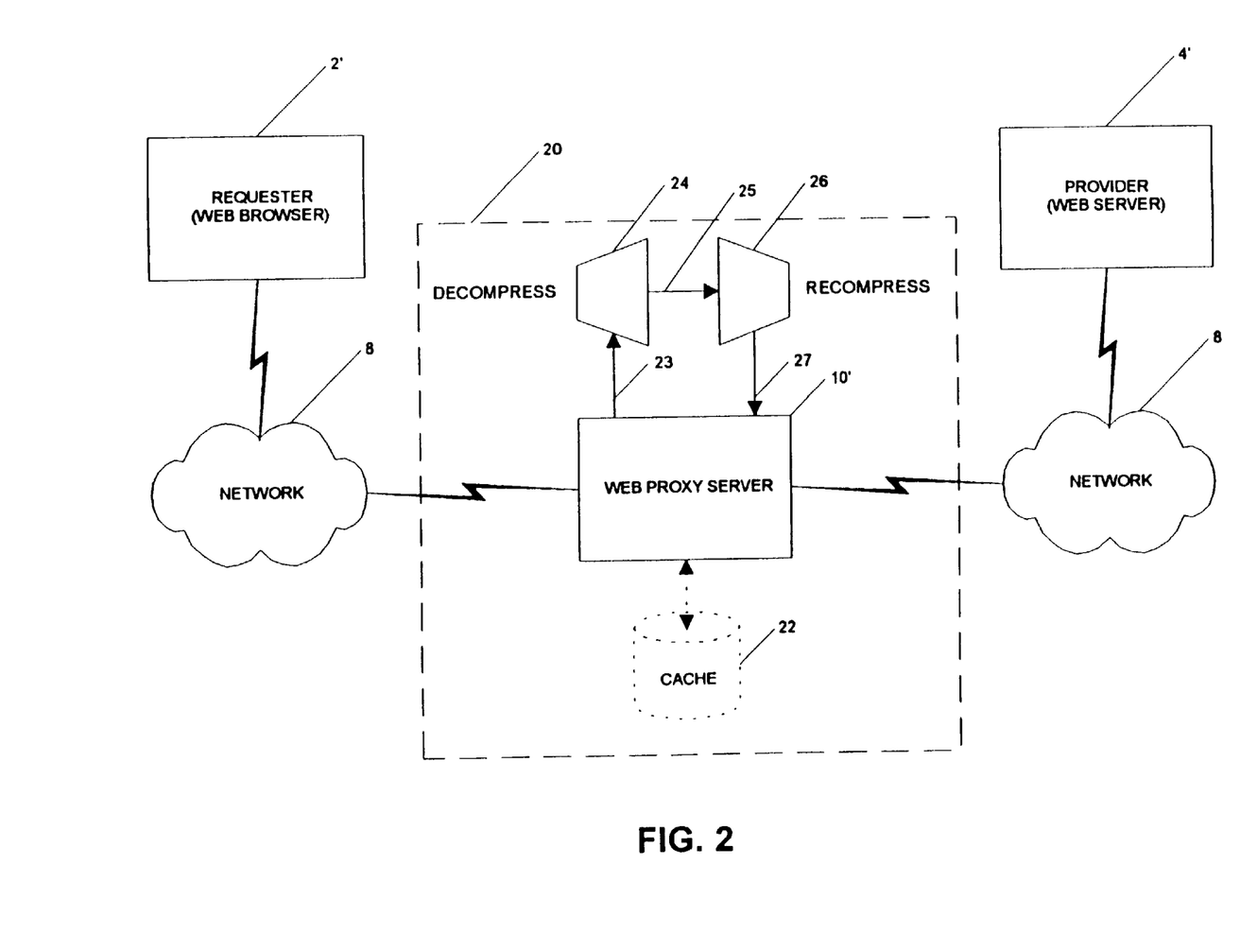
FIG. 2 is a diagram of the preferred hardware embodiment of the present invention.

FIG. 2 is a diagram of the preferred hardware embodiment of the present invention. The diagram shown in FIG. 2 is similar to the diagram shown in FIG. 1. A requester 2' (for example, a web browser on the World Wide Web service provided by the Internet) can send file requests to a provider 4' (for example, a web server on the Internet) via a network 8. Each request is processed through a recompression server 20 in accordance with the present invention.

The recompression server 20 includes a web proxy server 10' having an optional cache 22. The recompression server 20 also includes a data path from the web proxy server 10' along a first connection 23 through a decompressor through a recompressor 26, and along a third connection 27 back to the web proxy server 10'.

The components along the data path 23–27 can comprise hardware, a software or firmware programmed dedicated processor, or simply be software routines executed on the general processor(s) of the web proxy server 10', as a matter of design choice.

Figure 3:
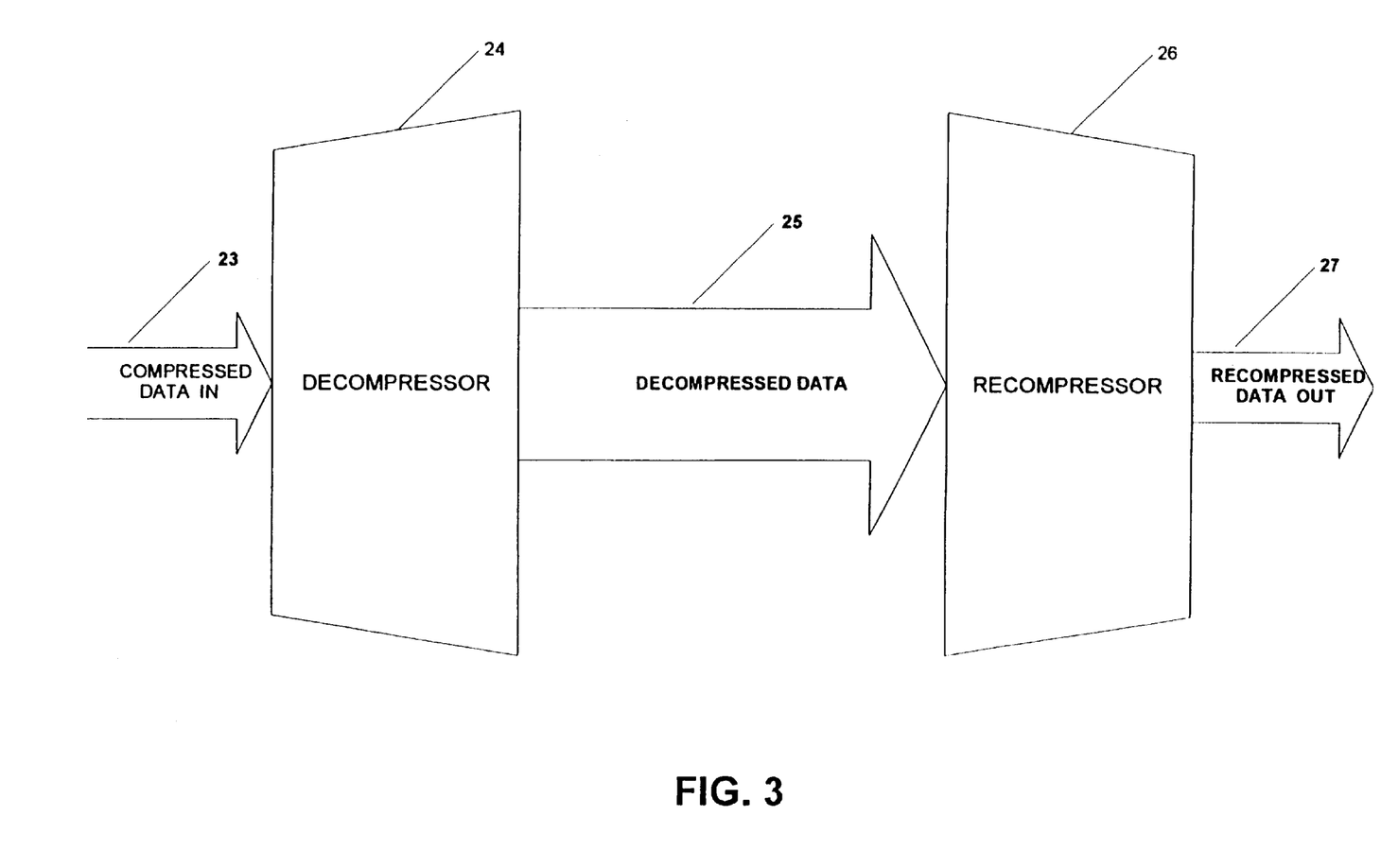
FIG. 3 is a block diagram showing the flow of selected data through the recompression server of FIG. 2.

FIG. 3 is a block diagram showing the flow of selected data through the recompression server of FIG. 2. When a file requested from a provider 4' passes through the recompression server 20, a determination is made in the web proxy server 10' whether the file is pre-compressed. If so, the compressed data 23 is routed along a first connection 23 to a decompressor 24. For example, if a requested data file is a graphics imaged compressed using the GIF standard, the file extension (.GIF) indicates that the file is pre-compressed. The file would be routed through the decompressor 24, which includes conventional decompression code for decompressing the GIF file. The decompressed data is routed along a second connection 25 (either directly or after temporary storage, such as in RAM or a mass storage device) to a recompressor 26.

The recompressor 26 re-compresses the decompressed data using any algorithm that provides a better compression ratio than the original compression. More than one recompression algorithm may be used if desired, to provide better compression for different data types. In the preferred embodiment, the algorithm used by the recompressor 26 for graphics files is a variable-loss (which includes no loss) compression algorithm called "GT", available from the former Johnson-Grace, Inc. of Newport Beach, Calif. (now America Online, of Virginia). This algorithm can give file sizes from 15% (for zero loss) to 70% smaller than the GIF standard, depending on desired degree of loss. Other algorithms, or combinations of algorithms, may be used, such as Huffman Coding, Lempel-Ziv '77, Lempel-Ziv '78, and Lempel-Ziv-Welch algorithms for lossless compression, and MPEG, JPEG, wavelet, and fractal algorithms for lossy compression.

After passing through the recompressor 26, the recompressed data passes along a third connection 27 back to the web proxy server 10' for transmission to the requester 2'.

As an optional step, the recompressed file may be cached in that form within the web proxy server 10' in a mass storage cache 22 (FIG. 2), so that faster response can be provided to requestors 2' for frequently requested pre-compressed files. Any caching algorithm may be used, such as a conventional "least recently used" (LRU) algorithm, to manage the cache 22. Alternatively, the web proxy server 10' may maintain a log of file requests, and select files to be recompressed and cached based upon logged request frequencies. Caching may be done on-line, while recompressing files, or off-line, using logged request frequencies to retrieve "popular" files and recompress them during idle time for the web proxy server 10'.

As another option, the recompression server 20 may compress requested but previously uncompressed files. This aspect of the invention is advantageously used with the caching option, since frequently requested uncompressed files can be compressed and cached within the recompression server 20 so that network bandwidth is conserved each time such a file is requested thereafter.

The invention may be implemented as a computer program storable on a media that can be read by a computer system, such as a web proxy server 10', so as to configure the computer system to provide the functions described herein. Again, while the invention has been described as if executed on a separate processor, it may be implemented as a software process executed within the web proxy server 10'.

Figure 4:
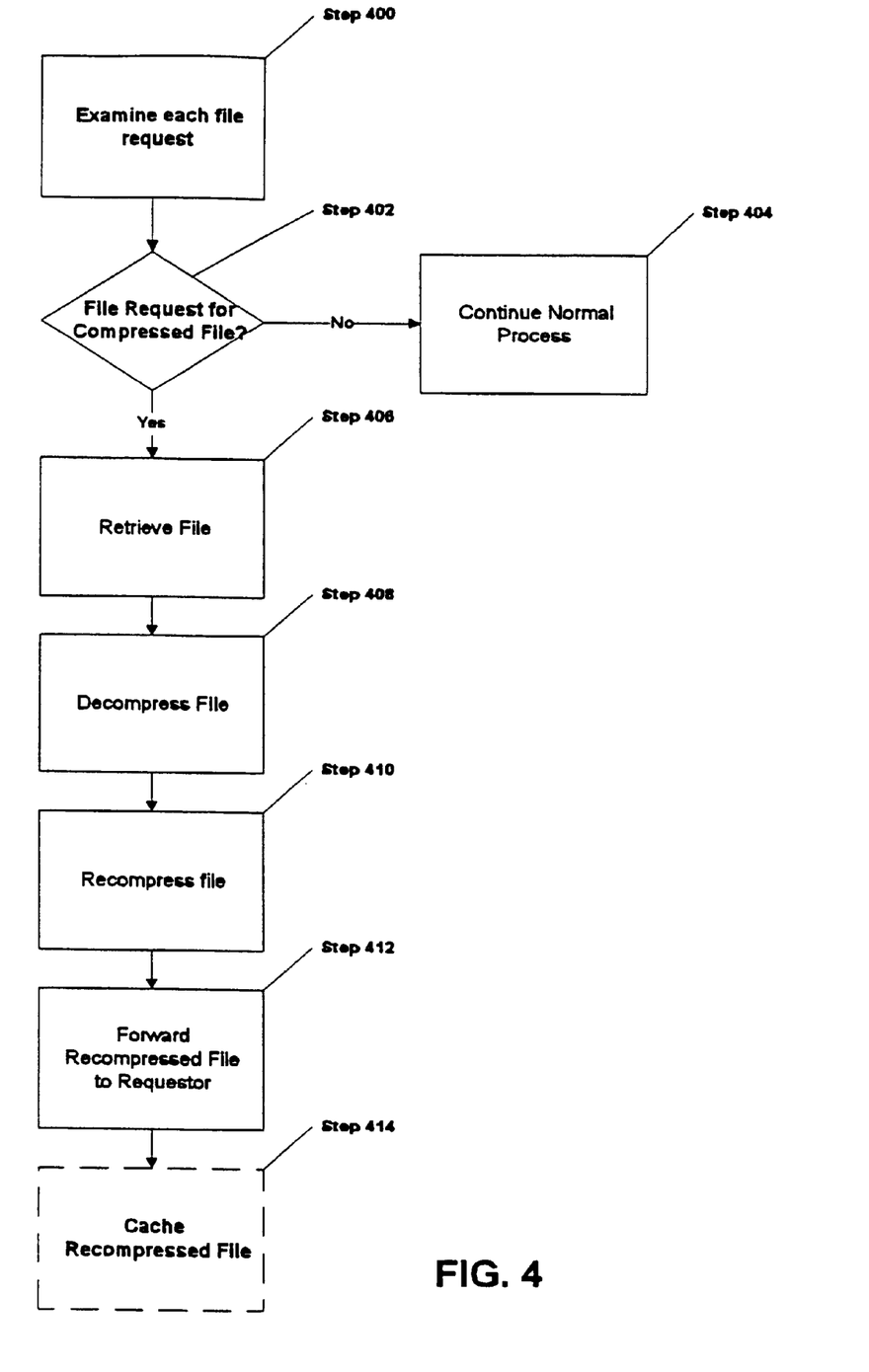
FIG. 4 is a flowchart showing the method of a first embodiment of the present invention.

FIG. 4 is a flowchart showing the method of a first embodiment of the present invention. The web proxy server 10' examines each file request from a requestor 2' to determine from the request itself that the requested file is pre-compressed (for example, by examining the file extension) (STEP 400). If the requested file is not pre-compressed (STEP 402), the web proxy server 10' continues normal processing (STEP 404).

If the requested file is pre-compressed (STEP 402), the file is retrieved in conventional fashion from the provider 4' (STEP 406). The file is then decompressed in the decompressor 24 (STEP 408) and recompressed in the recompressor 26 (STEP 410). The recompressed file is then forwarded to the requestor 2' in conventional fashion (STEP 412).

As an optional step, the recompressed file may be cached in that form within the web proxy server 10' in a mass storage cache 22 (STEP 414).

Figure 5:
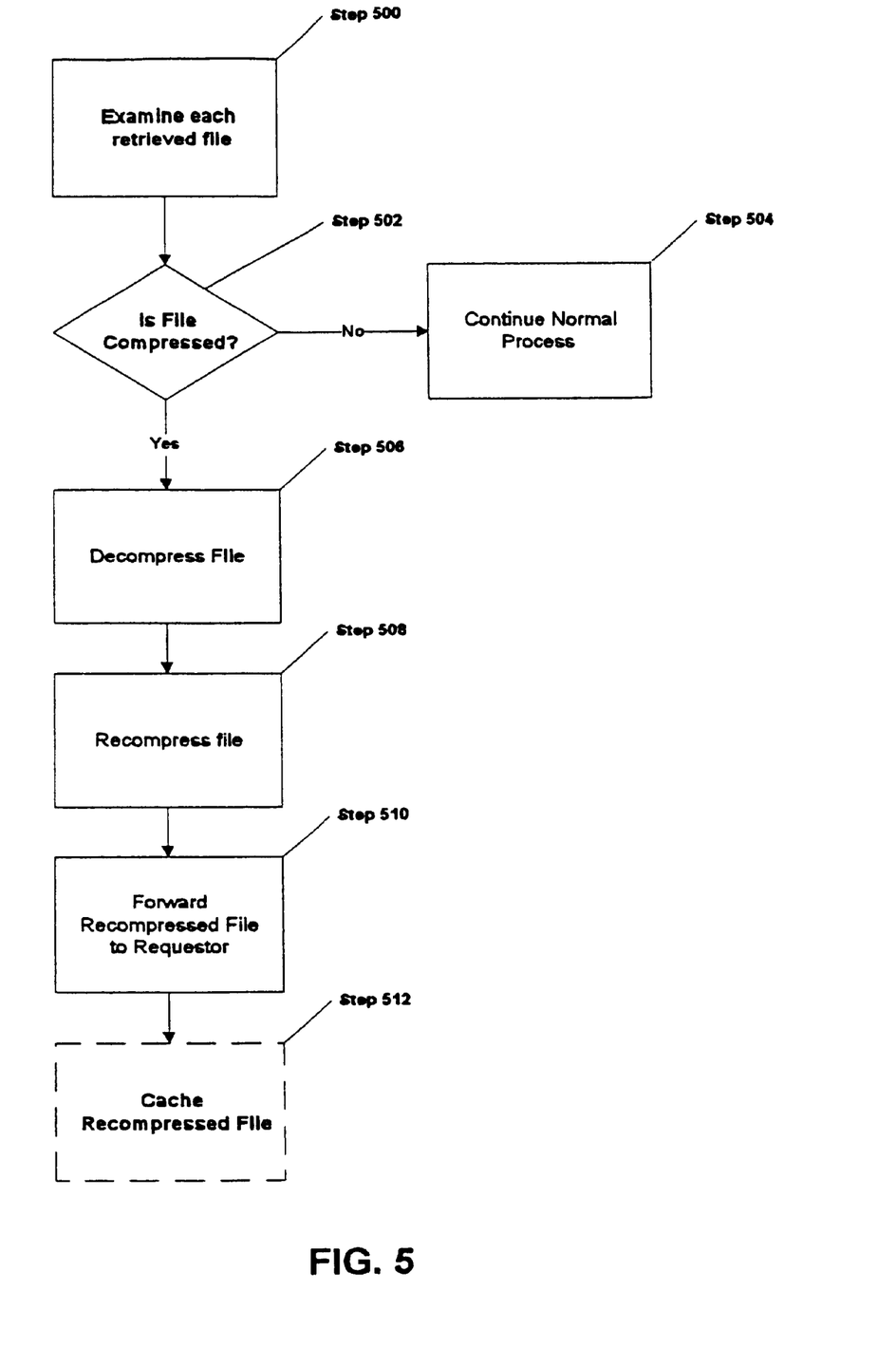
FIG. 5 is a flowchart showing the method of a second embodiment of the present invention.

FIG. 5 is a flowchart showing the method of a second embodiment of the present invention. In this embodiment, rather than examining a file request from a requester 2' to determine if a file is pre-compressed, as in the method shown in FIG. 4, files are retrieved in conventional fashion and then examined within the web proxy server 10' (STEP 500). Whether a file is pre-compressed or not may be determined by examination of the file extension (for example, .GIF or .TIF), or key bytes within a file header, or any other characteristic or attribute of the file that indicates compression.

If the requested file is not pre-compressed (STEP 502), the web proxy server 10' continues normal processing (STEP 504). If the requested file is pre-compressed (STEP 502), the file is then decompressed in the decompressor 24 (STEP 506) and recompressed in the recompressor 26 (STEP 508). The recompressed file is then forwarded to the requester 2' in conventional fashion (STEP 510).

As an optional step, the recompressed file may be cached in that form within the web proxy server 10' in a mass storage cache 22 (STEP 512).

In an alternative embodiment, rather than recompressing every compressed file or compressing every previously uncompressed file, additional testing may be done to decide whether the inventive process described above provides a time savings in transmission over simply retransmitting a requested file. For example, if a requested compressed file is small, the time required to decompress it and recompress it may exceed the time required to transfer it unchanged. In general, if $T_T$ is the estimated transfer time for a file, $T_D$ is the estimated decompression time (zero for an uncompressed file), and $T_R$ is the estimated recompression time (initial compression time if the file is originally uncompressed), then the invention should only be used where $T_R+T_D<T_T$. Estimates for $T_T$ can be readily obtained by measuring the actual bit rate to a particular requester, in known fashion. Estimates for $T_R$ and $T_D$ can be generated by first performing, in a preparation stage, a statistical analysis of actual decompression and recompression times versus file size for each compression type (e.g., GIF, TIFF, JPEG, etc.). Thus, by knowing the size of a particular requested file, an estimate can be readily determined for $T_R$ and $T_D$ by extrapolation. Alternatively, an estimate for $T_R$ and $T_D$ can be generated by decompressing a portion of a file and concurrently attempting to recompress that portion, timing each action, and extrapolating to the entire file size.

Referring to FIG. 4, this type of testing can be done before STEP 408. If the test indicates that $T_R+T_D$ is less than $T_T$, then processing continues at STEP 408. Otherwise, the requested file is directly forwarded to the requestor. Referring to FIG. 5, this type of testing can be done before STEP 506. If the test indicates that $T_R+T_D$ is less than $T_T$, then processing continues at STEP 506. Otherwise, the requested file is directly forwarded to the requester. In either method, the requested file may still be cached.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example, although the invention has been described in the context of a wide area public network, it can be applied to any network (including private wide area and local area networks) in which files requested from one node by another node pass through an intermediate processor that can be programmed or configured as a recompression server. Accordingly, it is to be understood that the invention is not to be limited by the specific illustrated embodiment, but only by the scope of the appended claims.

What is claimed is:

1. A method for decreasing bandwidth utilization in a network, the method comprising:
   receiving a request from an end-user for a desired data file;
   determining a compression status of the data file;
   estimating a time required to transmit the desired data file to the end-user;
   decompressing the data file if the data file is precompressed and the estimated time supports decompression;
   compressing the data file if the data file is noncompressed and recompressing the data file if the data file is decompressed; and
   transmitting the data file to the end-user.

2. A method as claimed in claim 1, further comprising gathering the data file from the data file's storage location.

3. A method as claimed in claim 1, further comprising storing the compressed data file or recompressed data file in a cache.

4. A method as claimed in claim 3, further comprising gathering the data file by searching the cache of compressed and recompressed data files for the desired data file.

5. A method as claimed in claim 3, wherein determining the compression status comprises examining the cache for the data file.

6. A method as claimed in claim 1, wherein determining the compression status comprises examining a file request from the end-user.

7. A method as claimed in claim 1, wherein determining the compression status comprises examining the data file.

8. A method as claimed in claim 1, further comprising:
   before decompressing, determining whether an estimated time required to directly provide the precompressed data file to the end-user would be less than an estimated time to decompress the precompressed data file and recompress the decompressed data file; and
   if not, then continuing with the decompressing, and if so, then providing the precompressed data file directly to the end-user.

9. A method as claimed in claim 1, further comprising:
   before compressing, determining whether an estimated time required to directly provide the noncompressed data file to the end-user would be less than an estimated time to compress the noncompressed data file; and
   if not, then continuing with the compressing, and if so, then providing the noncompressed data file directly to the end-user.

10. A system for decreasing bandwidth utilization in a network comprising:
    means for receiving an end-user request for a desired data file;
    means for determining a compression status of the data file;
    means for estimating a time required to transmit the desired data file to the end-user;
    a decompressor for decompressing precompressed data files when the estimated time supports decompression;
    a recompressor for compressing noncompressed data files and recompressing decompressed data files; and
    means for transmitting the compressed or recompressed data file to the end-user.

11. A system as claimed in claim 10, further comprising a means for gathering the data file from the data file's storage location.

12. A system as claimed in claim 10, further comprising a cache for storing the compressed data file or recompressed data file.

13. A system as claimed in claim 12, further comprising a means for gathering the data file by searching the cache of compressed and recompressed data files for the desired data file.

14. A system as claimed in claim 12, wherein determining the compression status comprises examining the cache of compressed and recompressed data files for the desired data file.

15. A system as claimed in claim 10, further comprising a means for determining the compression status by examining the file request from the end-user.

16. A system as claimed in claim 10, further comprising a means for determining the compression status by examining the data file.

17. A system as claimed in claim 10, further comprising a testing means for determining whether an estimated time required to directly provide the precompressed data file to the end-user would be less than an estimated time to decompress the precompressed data file and recompress the decompressed data file, and if so, then providing the precompressed data file directly to the end-user.

18. A system as claimed in claim 10, further comprising a testing means for determining whether an estimated time required to directly provide the noncompressed data file to the end-user would be less than an estimated time to compress the noncompressed data file, and if so, then providing the noncompressed data file directly to the end-user.

19. A computer program for decreasing bandwidth utilization in a network system, the computer program being tangibly stored on a media readable by a computer system, for configuring the computer system upon being read and executed by the computer system to perform the functions of:
    receiving a request from an end-user for a desired data file;
    determining a compression status of the data file;
    estimating a time required to transmit the desired data file to the end-user;
    decompressing the data file if the data file is precompressed and the estimated time supports decompression;

compressing the data file if the data file is noncompressed and recompressing the data file if the data file is decompressed; and transmitting the data file to the end-user.

20. A computer program as claimed in claim 19, further comprising the function of gathering the data file from the data file's storage location.

21. A computer program as claimed in claim 19, further comprising the function of storing the compressed data file or the recompressed data file in a cache.

22. A computer program as claimed in claim 21, further comprising the function of gathering the data file by searching the cache of compressed and recompressed data files for the desired data file.

23. A computer program as claimed in claim 21, further comprising the function of determining the compression status of the data file by examining the cache for the desired data file.

24. A computer program as claimed in claim 19, further comprising the function of determining the compression status by examining a file request received from the end-user.

25. A computer program as claimed in claim 19, further comprising the function of determining the compression status by examining the data file.

26. A computer program as claimed in claim 19, further comprising the functions of:
    before decompressing, determining whether an estimated time required to directly provide the precompressed data file to the end-user would be less than an estimated time to decompress the precompressed data file and recompress the decompressed data file; and
    if not, then continuing with the decompressing, and if so, then providing the precompressed data file directly to the end-user.

27. A computer program as claimed in claim 19, further comprising the functions of:
    before compressing, determining whether an estimated time required to directly provide the noncompressed data file to the end-user would be less than an estimated time to compress the noncompressed data file; and
    if not, then continuing with the compressing, and if so, then providing the noncompressed data file directly to the end-user.

28. A method of retrieving requested objects in a computer network comprising a plurality of nodes, the method comprising:
    determining at a first node whether a requested object located at a second node is precompressed or noncompressed;
    estimating a time required to directly provide the requested object to a third node; and
    selectively decompressing and/or compressing the requested object at the first node depending on a result of the determination and the estimated time.

29. A method as claimed in claim 28, wherein the requested object is a file.

30. A method as claimed in claim 28, wherein the requested object is an image.

31. A method as claimed in claim 28, wherein the requested object is data.

32. A method as claimed in claim 28, wherein selectively decompressing and/or compressing comprises:
    (a) compressing the object if the object at the second node is determined to be noncompressed; and
    (b) decompressing the object and recompressing the decompressed object if the object at the second node is determined to be precompressed.

33. A method as claimed in claim 28, the method further comprising, after selectively decompressing and/or compressing, transferring object to a third node that requested the object.

34. A method for decreasing bandwidth utilization in a network, the method comprising:
    receiving a request from an end-user for a desired data file;
    determining a compression status of the data file;
    decompressing the data file if the data file is precompressed;
    if the data file is noncompressed, compressing the data file and recompressing the decompressed data file; and
    transmitting the compressed or recompressed data file to the end-user,
    wherein decompressing is selectively performed according to whether an estimated time required to directly provide the precompressed data file to the end-user would be less than an estimated time to decompress the precompressed data file and recompress the decompressed data file.

35. A method as claimed in claim 34 further comprising gathering the data file from the data file's storage location.

36. A method as claimed in claim 34 further comprising storing the compressed data file or the recompressed data file in a cache.

37. A method as claimed in claim 36 further comprising gathering the data file by searching the cache for the desired data file.

38. A method as claimed in claim 36 wherein determining the compression status comprises examining the cache for the data file.

39. A method as claimed in claim 34 wherein determining the compression status comprises examining a file request from the end-user.

40. A method as claimed in claim 34 wherein determining the compression status includes examining the data file.

41. A method for decreasing bandwidth utilization in a network, the method comprising:
    receiving a request from an end-user for a desired data file;
    determining a compression status of the data file;
    if the data file is precompressed, decompressing the data file and recompressing the decompressed data file;
    if the data file is noncompressed, compressing the data file;
    transmitting the compressed or recompressed data file to the end-user,
    wherein compressing is selectively performed according to whether an estimated time required to directly provide the noncompressed data file to the end-user would be less than an estimated time to compress the noncompressed data file.

42. A method as claimed in claim 41 further comprising gathering the data file from the data file's storage location.

43. A method as claimed in claim 41 further comprising storing the compressed data file or the recompressed data file in a cache.

44. A method as claimed in claim 43 further comprising gathering the data file by searching the cache for the desired data file.

45. A method as claimed in claim 43 wherein determining the compression status comprises examining the cache for the data file.

46. A method as claimed in claim 41 wherein determining the compression status comprises examining a file request from the end-user.

47. A method as claimed in claim 41 wherein determining the compression status includes examining the data file.

48. A system for decreasing bandwidth utilization in a network comprising:
   means for receiving an end-user request for a desired data file;
   means for determining a compression status of the data file;
   a decompressor for decompressing precompressed data files;
   a compressor for compressing noncompressed data files and recompressing decompressed data files;
   means for transmitting compressed or recompressed data files to the end-user; and
   means for selectively activating the decompressor according to whether an estimated time required to directly provide the precompressed data file to the end-user would be less than an estimated time to decompress the precompressed data file and recompress the decompressed data file.

49. A system as claimed in claim 48 further comprising means for gathering the data file from the data file's storage location.

50. A system as claimed in claim 48 further comprising a cache for storing the compressed data file or recompressed data file.

51. A system as claimed in claim 50 further comprising means for gathering the data file by searching the cache for the desired data file.

52. A system as claimed in claim 50 wherein the means for determining the compression status examines the cache for the desired data file.

53. A system as claimed in claim 48 further comprising means for determining the compression status by examining the file request from the end-user.

54. A system as claimed in claim 48 further comprising means for determining the compression status by examining the data file.

55. A system for decreasing bandwidth utilization in a network comprising:
   means for receiving an end-user request for a desired data file;
   means for determining a compression status of the data file;
   a decompressor for decompressing precompressed data files;
   a compressor for compressing noncompressed data files and recompressing decompressed data files;
   means for transmitting compressed or recompressed data files to the end-user, and
   means for selectively activating the compressor according to whether an estimated time required to directly provide the noncompressed data file to the end-user would be less than an estimated time to compress the noncompressed data file.

56. A system as claimed in claim 55 further comprising means for gathering the data file from the data file's storage location.

57. A system as claimed in claim 55 further comprising a cache for storing the compressed data file or recompressed data file.

58. A system as claimed in claim 57 further comprising means for gathering the data file by searching the cache for the desired data file.

59. A system as claimed in claim 57 wherein the means for determining the compression status comprises examining the cache of compressed and recompressed data files for the desired data file.

60. A system as claimed in claim 55 further comprising means for determining the compression status by examining the file request from the end-user.

61. A system as claimed in claim 55 further comprising means for determining the compression status by examining the data file.

62. A computer program for decreasing bandwidth utilization in a network system, the computer program being tangibly stored on a medium readable by a computer system, for configuring the computer system upon being read and executed by the computer system to perform the functions of:
   receiving a request from an end-user for a desired data file;
   determining a compression status of the data file;
   if the data file is precompressed, decompressing the data file and recompressing the decompressed data file;
   if the data file is noncompressed, compressing the data file; and
   transmitting the compressed or recompressed data file to the end-user,
   wherein decompressing is selectively performed according to whether an estimated time required to directly provide the precompressed data file to the end-user would be less than an estimated time to decompress the precompressed data file and recompress the decompressed data file.

63. A computer program as claimed in claim 62 further comprising the function of gathering the data file from the data file's storage location.

64. A computer program as claimed in claim 62 further comprising the function of storing the compressed data file or the recompressed data file in a cache.

65. A computer program as claimed in claim 64 further comprising the function of gathering the data file by searching the cache of compressed and recompressed data files for the desired data file.

66. A computer program as claimed in claim 64 further comprising the function of determining the compression status of the data file by examining the cache for the desired data file.

67. A computer program as claimed in claim 62 further comprising the function of determining the compression status by examining a file request received from the end-user.

68. A computer program as claimed in claim 62 further comprising the function of determining the compression status by examining the data file.

69. A computer program for decreasing bandwidth utilization in a network system, the computer program being tangibly stored on a media readable by a computer system, for configuring the computer system upon being read and executed by the computer system to perform the functions of:
   receiving a request from an end-user for a desired data file;
   determining a compression status of the data file;
   if the data file is precompressed, decompressing the data file and recompressing the decompressed data file;
   if the data file is noncompressed compressing the data file; and
   transmitting the recompressed or decompressed data file to the end-user, wherein compressing is selectively performed according to whether an estimated time required to directly provide the noncompressed data file to the end-user would be less than an estimated time to compress the noncompressed data file.

70. A computer program as claimed in claim 69 further comprising the function of gathering the data file from the data file's storage location.

71. A computer program as claimed in claim 69 further comprising the function of storing the compressed data file or the recompressed data file in a cache.

72. A computer program as claimed in claim 71 further comprising the function of gathering the data file by searching the cache for the desired data file.

73. A computer program as claimed in claim 71 further comprising the function of determining the compression status of the data file by examining the cache for the desired data file.

74. A computer program as claimed in claim 69 further comprising the function of determining the compression status by examining a file request received from the end-user.

75. A computer program as claimed in claim 69 further comprising the function of determining the compression status by examining the data file.

* * * * *